US011621957B2

(12) United States Patent
Gandhi et al.

(10) Patent No.: US 11,621,957 B2
(45) Date of Patent: Apr. 4, 2023

(54) IDENTITY VERIFICATION FOR NETWORK ACCESS

(71) Applicant: Cisco Technology, Inc., San Jose, CA (US)

(72) Inventors: Indermeet Gandhi, San Jose, CA (US); Srinath Gundavelli, San Jose, CA (US); Pradeep Kumar Kathail, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 181 days.

(21) Appl. No.: 17/218,602

(22) Filed: Mar. 31, 2021

(65) Prior Publication Data

US 2022/0321556 A1 Oct. 6, 2022

(51) Int. Cl.
| | |
|---|---|
| *G06F 21/00* | (2013.01) |
| *H04L 9/40* | (2022.01) |
| *H04W 12/06* | (2021.01) |
| *H04L 9/30* | (2006.01) |
| *H04W 12/08* | (2021.01) |
| *G06F 21/60* | (2013.01) |

(52) U.S. Cl.
CPC ........ *H04L 63/0861* (2013.01); *G06F 21/604* (2013.01); *H04L 9/30* (2013.01); *H04L 63/0884* (2013.01); *H04L 63/10* (2013.01); *H04W 12/068* (2021.01); *H04W 12/08* (2013.01); *G06F 2221/2103* (2013.01); *G06F 2221/2113* (2013.01); *G06F 2221/2117* (2013.01)

(58) Field of Classification Search
CPC ... H04L 63/0861; H04L 9/30; H04L 63/0884; H04L 63/10; G06F 21/604; G06F 2221/2103; G06F 2221/2113; G06F 2221/2117; G06F 21/32; H04W 12/068; H04W 12/08
See application file for complete search history.

(56) References Cited

U.S. PATENT DOCUMENTS

| | | | |
|---|---|---|---|
| 7,249,177 B1 | 7/2007 | Miller | |
| 8,689,013 B2* | 4/2014 | Habraken | ............. G07F 7/1008 713/193 |
| 11,336,686 B2* | 5/2022 | Buhacoff | ............ H04L 63/1483 |
| 2008/0098464 A1* | 4/2008 | Mizrah | .................... G06F 21/36 726/5 |
| 2011/0314530 A1 | 12/2011 | Donaldson | |
| 2016/0087957 A1 | 3/2016 | Shah | |
| 2016/0094531 A1* | 3/2016 | Unnikrishnan | ......... H04L 63/08 726/7 |

(Continued)

*Primary Examiner* — Kendall Dolly
(74) *Attorney, Agent, or Firm* — Lee & Hayes, P.C.

(57) ABSTRACT

This disclosure describes techniques for authentication related to verification of identity for network access. The techniques may include sending a challenge associated with authentication to a network to a mobile device. In response to sending the challenge, the techniques may include receiving a challenge response from the mobile device. The challenge response may include biometric credential information associated with a user of the mobile device. The challenge response may also include an indication of an authorization assertion associated with the authentication to the network. In some examples, the techniques may include tailoring access to the network for the mobile device based on the biometric credential information.

20 Claims, 10 Drawing Sheets

(56) References Cited

U.S. PATENT DOCUMENTS

| | | |
|---|---|---|
| 2016/0127900 A1 | 5/2016 | John Archibald |
| 2018/0260553 A1 | 9/2018 | Hoyos |
| 2018/0367526 A1* | 12/2018 | Huang .................. H04L 63/083 |
| 2020/0089867 A1* | 3/2020 | Kim ....................... H04L 9/3271 |
| 2020/0313910 A1* | 10/2020 | Lindemann ........... H04L 9/3231 |
| 2022/0123950 A1* | 4/2022 | Erickson ................ G06F 9/5072 |
| 2022/0182382 A1* | 6/2022 | Leddy, III .............. G06Q 20/12 |
| 2022/0247783 A1* | 8/2022 | Buhacoff ................ H04L 63/08 |

\* cited by examiner

IDENTITY VERIFICATION FOR NETWORK ACCESS

TECHNICAL FIELD

The present disclosure relates generally to authentication related to verification of identity for network access.

BACKGROUND

Enterprise networks may include a technology infrastructure that midsize and/or large organizations can use to provide connectivity among users, devices, and applications. An enterprise network may help support an organization by delivering connected digital services, reliably and securely. The users of the digital services may include workers, partners, customers, etc. Users may periodically connect and disconnect from the enterprise network. For example, a worker may connect to the enterprise network when they arrive for work, entering a building associated with the organization. The organization may therefore be interested in allowing some users to securely access an enterprise network, while preventing unauthorized users from inappropriately accessing the enterprise network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
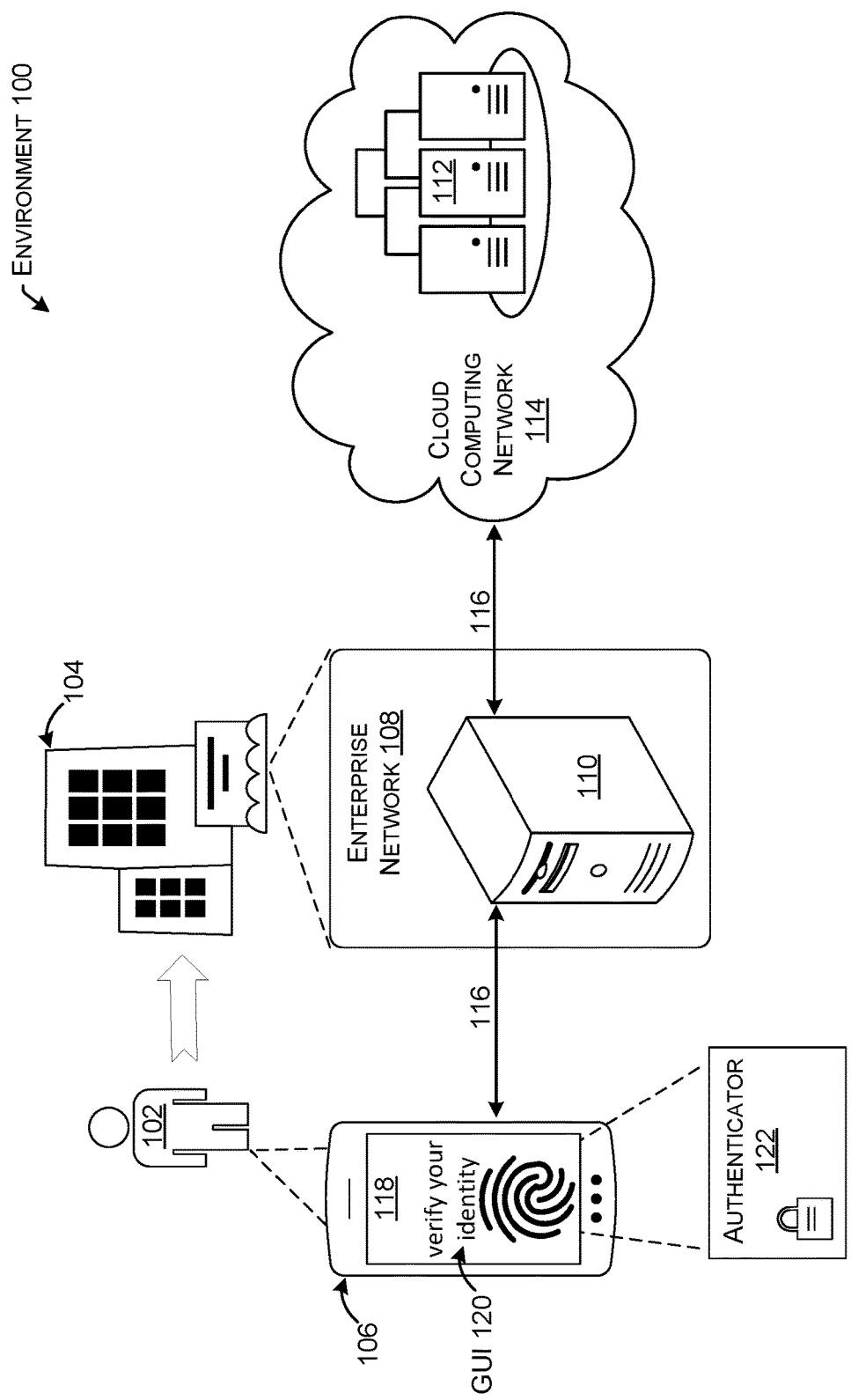
FIGS. 1 and 4 illustrate component diagrams with example environments in which authentication techniques may be employed as part of communications between mobile device(s) and network device(s), in accordance with the present concepts.

This disclosure describes, at least in part, a method that may be implemented by a mobile device communicatively coupled to a computing device. The method may include receiving, at the mobile device, an identification request for authentication to a network. In response to receiving the identification request, the method may include sending an identification response that includes user identification information related to a user of the mobile device. The method may include receiving a challenge associated with the authentication to the network. The method may also include providing information to an authenticator, the information including the challenge associated with the authentication to the network and biometric data. Further, the method may include receiving, at the mobile device and from the authenticator, an authorization assertion associated with the authentication to the network. In response to receiving the authorization assertion, the method may include sending a challenge response that includes an indication of the authorization assertion. Finally, the method may include receiving an indication of success associated with the authentication to the network.

This disclosure also describes, at least in part, a method that may be implemented by network resources (e.g., a server device) communicatively coupled to a mobile device or a computing device of a network. The method may include sending, to the mobile device, an identification request for authentication to a network. In response to sending the identification request, the method may include receiving, from the mobile device, an identification response that includes user identification information related to a user of the mobile device. The method may include verifying a registration of the user with the network. Based at least in part on the verifying the registration of the user, the method may include sending, to the mobile device, a challenge associated with the authentication to the network. In response to sending the challenge, the method may include receiving, from the mobile device, a challenge response. The challenge response may include biometric credential information associated with the user. The challenge response may also include an indication of an authorization assertion associated with the authentication to the network. The method may also include accessing a public key of the user, the public key being associated with the registration of the user with the network. Further, the method may include verifying the authorization assertion using the public key. Based at least in part on the verifying the authorization assertion, the method may include sending, to the mobile device, an indication of success associated with the authentication to the network.

This disclosure also describes, at least in part, another method that may be implemented by network resources (e.g., a server device) communicatively coupled to a mobile device or a computing device of a network. The method may include sending, to the mobile device, an identification request. In response to sending the identification request, the method may include receiving, from the mobile device, an identification response that includes user identification information related to a registration of a user with a network. Using the identification information, the method may include verifying the registration of the user with the network. Based at least in part on the verifying the registration of the user, the method may include sending, to the mobile device, a challenge associated with authentication to the network. In response to sending the challenge, the method may include receiving, from the mobile device, a challenge response. The challenge response may include biometric credential information associated with the user. The challenge response may also include an indication of an authorization assertion associated with the authentication to the network. Using a public key associated with the registration of the user with the network, the method may include verifying the authorization assertion. Based at least in part on the verifying the authorization assertion, the method may include granting access to the network to the mobile device.

Additionally, the techniques described herein may be performed by a system and/or device having non-transitory computer-readable media storing computer-executable instructions that, when executed by one or more processors, performs the method described above.

Example Embodiments

This disclosure describes techniques for authentication related to verification of identity for network access. In some implementations, the network access may be wireless access. The network access may be related to an enterprise network, in some cases. For example, the enterprise network may deliver wirelessly connected digital services to an organization (e.g., company, corporation). Various users, such as workers, partners, customers, etc., may seek the network access. In some implementations, the users may seek the network access using a mobile device (e.g., phone, laptop, etc.). In the disclosed authentication techniques, authentication for network access may include using a biometric form of verification of identity via a mobile device. Stated another way, the disclosed authentication techniques may include providing native integration of biometric authentication to provide wireless network access in enterprise networks. In some examples, the authentication techniques may also enable an enterprise network to be aware of and/or request a type of authentication (e.g., password, fingerprint, iris pattern) being used. Therefore, the present authentication techniques may enable application of differentiated controls regarding the network access, depending on the type of authentication provided. As such, the present authentication techniques may improve security for the network, assist in managing operations of the network, and increase efficiency and/or ease-of-use for users.

Networks (e.g., enterprise networks) may have difficulty providing secure, convenient authentication methods for users. For example, a password may be either so simple that the password is easily guessed by a hacker, or so complex that the password is hard for a user to remember. In another example, an organization may rely on using a certificate to avoid using passwords. However, with the use of certificates (as well as with passwords), the organization still does not have visibility on an identity of the user that is actually requesting the network access. The organization may still wonder, is the requesting user truly the authorized user, or a potentially unauthorized user who managed to obtain the password credentials (e.g., certificate, etc.) of an authorized user? Biometric identity may help resolve the issue of not just what a requesting user knows, but actually who the requesting user is. The present techniques may provide the ability to validate an identity of a user by comparing the presented characteristics of the user with the registered biometric-template of that user in enterprise access-authentication, for instance.

Biometric technology is integrated into many mobile devices. The biometric technology may be used for accessing a mobile device itself and/or accessing an application on the mobile device. The present authentication techniques include extending use of the biometric technology for authentication related to network access, including networks such as enterprise networks, Wi-Fi, private long-term evolution (LTE) and/or fifth generation (5G), public 5G, and/or third generation partnership project (3GPP) networks. Furthermore, in some examples a network may be associated with a geographic location, such as a workplace. However, in other cases, a user may wish to access a network remotely. For instance, the user may wish to access a particular network, such as an enterprise network, via a public 5G network (e.g., secondary authentication via 5G). The present authentication techniques are relevant for 5G roaming and/or secondary authentication scenarios as well.

In some implementations, the present authentication techniques may be viewed as allowing augmentation of current authentication methods (e.g., password, certification, SIM) used for access authentication to Wi-Fi, private LTE, private 5G, etc., with an additional biometric verification technique for achieving multi-factor authentication (MFA) over a single device. Although MFA on a same mobile device may be currently used for some application logins, the mobile device requires existing, stable network connectivity to receive the MFA notifications. Therefore, the present authentication techniques provide something new, the basic network connectivity for authentication. Stated another way, the present authentication techniques include extending use of biometric technology for authentication from the application layer to the network layer. In some implementations, the present authentication techniques include native integration within access-authentication protocols. An example access-authentication protocol for the present authentication techniques may include extensible authentication protocol (EAP). The access-authentication protocol may run over a remote authentication dial-in user server (RADIUS), for instance. The present techniques may provide biometric authentication inline, in contrast with an out-of-band mechanism through a secondary device. The present techniques also retain the option of using MFA, with biometric authentication on the primary device and the secondary authentication on a secondary device. In another variation, the present techniques may be used as an additional step in an authentication process by augmenting a current method (e.g., password, certification, SIM, etc.), making the authentication process MFA, but using a single device.

Additionally, the present authentication techniques include making the network aware of the type of biometric identity and/or other credential type used for authentication. For example, the network may be made aware of whether the user authenticated with fingerprint, facial, iris, pattern, some other biometric identity, a personal identification number (PIN), a combination of credential types, etc. Knowing the type of credential may allow the network (and/or the organization) to apply finer network access controls, such as increased or decreased access to resources related to the strength of the credential. In one example instance, a mandatory facial scan may be required for access to a private 5G in a restricted area. Knowing the type of biometric identity may allow the network to trigger a mobile device and/or a secondary device for a different type of biometric authentication, and/or for a plurality of credential types, in some instances. Stated another way, visibility of the credential type may allow a network to apply granular policies accordingly. In some examples, EAP attribute-value pairs (AVPs) may be used to provide visibility of the credential type. With visibility on the credential type, the network may take further action in some instances, such as requesting additional information and/or an additional credential type from the user.

To summarize, simple and secure network access authentication may be available through built-in biometric identity authenticators on a mobile device. With the convenience of tapping a security key or using a fingerprint scan, Wi-Fi access, private 5G/LTE access and/or secondary authentication over a public 5G network may be seamless and secure, without the need to carry a secondary device or provide a cumbersome password. The network may now receive an assurance of who, in particular, is using the mobile device and requesting access. The network may be able to apply policies regarding access to resources based on the identity of the person and/or the type of credential with which the person authenticates. As such, the present authentication techniques may be viewed as enabling password-less and/or MFA for network access using a single device.

Although the examples described herein may refer to a mobile device as the entity requesting access to a network, the techniques can generally be applied to any device associated with a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present authentication concepts. Example environment 100 may include a user 102 and an organization 104. For purposes of illustration, the user 102 may be viewed as an employee of organization 104. In this scenario, the user 102 is approaching the organization 104. For instance, the user 102 may be arriving at their workplace or otherwise entering a building associated with the organization 104.

User 102 may be carrying a mobile device 106 as they approach organization 104. For example, mobile device 106 may be a smart phone, computer, laptop, tablet, etc. Organization 104 may use an enterprise network 108 to provide digital services to affiliated employees. Enterprise network 108 may be provided by one or more computing devices 110. Computing device(s) 110 may be a server, server device, network device, router, etc., that is configured to provide data and/or network services to mobile device(s) 106, and/or configured to enable authentication of mobile device 106 and/or user 102 to enterprise network 108. In some examples, at least a portion of enterprise network 108 may represent a wireless local area network (WLAN). For instance, computing device 110 may be part of a WLAN infrastructure. Environment 100 may also include network resources 112 (e.g., a network resources system, server devices) and cloud computing network 114. Network resources 112 may include one or more of a variety of servers, server devices, network devices, routers, etc., that may be configured to provide computing resources via cloud computing network 114.

In some examples, mobile device 106, computing device 110, and/or network resources 112 may exchange communications (e.g., packets) via a network connection(s), indicated by double arrows 116. For instance, network connections 116 may be transport control protocol (TCP) network connections or any network connection (e.g., information-centric networking (ICN)) that enables computing device 110 to exchange packets with other devices. The network connections 116 may be wireless and/or wired connections. The network connections 116 represent, for example, data paths between the computing device 110, mobile device 106, and/or network resources 112. It should be appreciated that the term "network connection" may also be referred to as a "network path." The use of a cloud computing network in this example is not meant to be limiting. Other types of networks are contemplated in accordance with authentication concepts.

In some implementations, as user 102 approaches organization 104, user 102 may wish to log on to enterprise network 108. For instance, user 102 may request access via their mobile device 106. Computing device 110 may receive the request. In response, computing device 110 may cause an authentication message to appear on a display 118 of mobile device 106. In this scenario, the authentication message may be represented by graphical user interface 120, which presents the message: "verify your identity" with a fingerprint symbol. User 102 may then proceed to engage a fingerprint biometric identity reader of mobile device 106. Mobile device 106 may include an authenticator 122. Authenticator 122 may be internal or external to mobile device 106. For instance, authenticator 122 may represent a hardware security module (HSM). Authenticator 122 may assist with authentication of mobile device 106 and/or user 102 to enterprise network 108. (More detail regarding registering a device and/or authenticating using a device will be provided below relative to FIGS. 2 and 3, for example.) In some examples, enterprise network 108 may communicate with network resources 112, such as to verify various aspects regarding authentication of user 102. For instance, enterprise network 108 may send and/or receive information generated by authenticator 122. Once network resources 112 confirms the identity and/or appropriate access level of user 102, enterprise network 108 may allow user 102 to access enterprise network 108. Note that in some implementations, enterprise network 108 may be capable of sensing the approach of user 102 and/or mobile device 106, and may initiate a registration and/or authentication process or message without receiving a request from user 102.

As described above, user 102 is able to join enterprise network 108 by simply providing his/her fingerprint, or other biometric credential. User 102 may therefore arrive at organization 104 and begin interfacing with enterprise network 108 without having to remember and/or type in a password to mobile device 106. Enterprise network 108 knows precisely who has arrived at organization 104 due to the use of biometric technology, and can be confident that an appropriate level of access to enterprise network 108 is being granted, based on an established policy. Therefore, network security is improved with an easy-to-use process for authentication.

Figure 2:
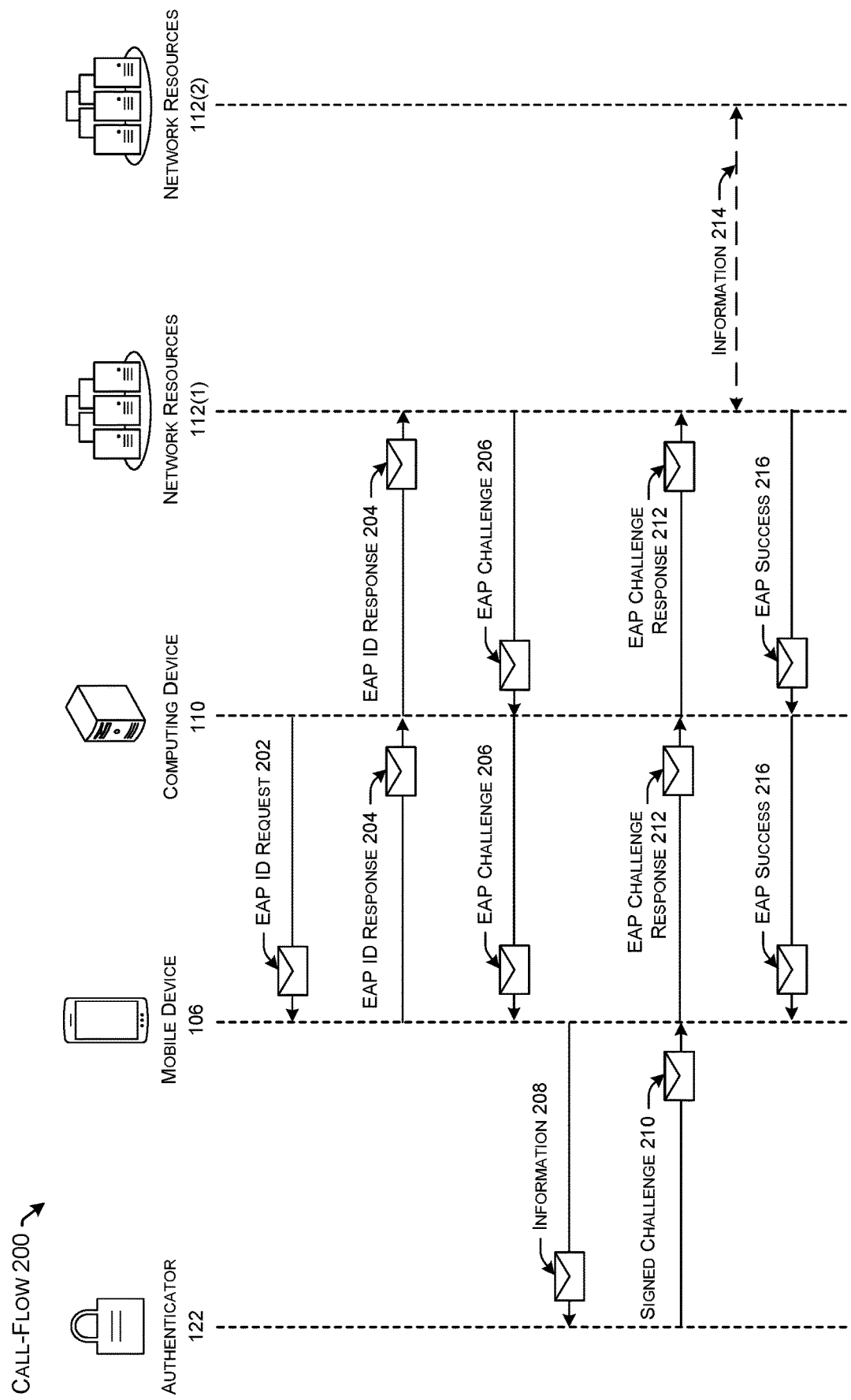
FIGS. 2, 3, and 5 illustrate example call-flows illustrating example communications that relate to component diagrams illustrated in FIGS. 1 and 4. The example communications may be employed as part of communications between the example mobile device(s) and network device(s) illustrated in FIGS. 1 and 4, in accordance with the present concepts.
Figure 3:
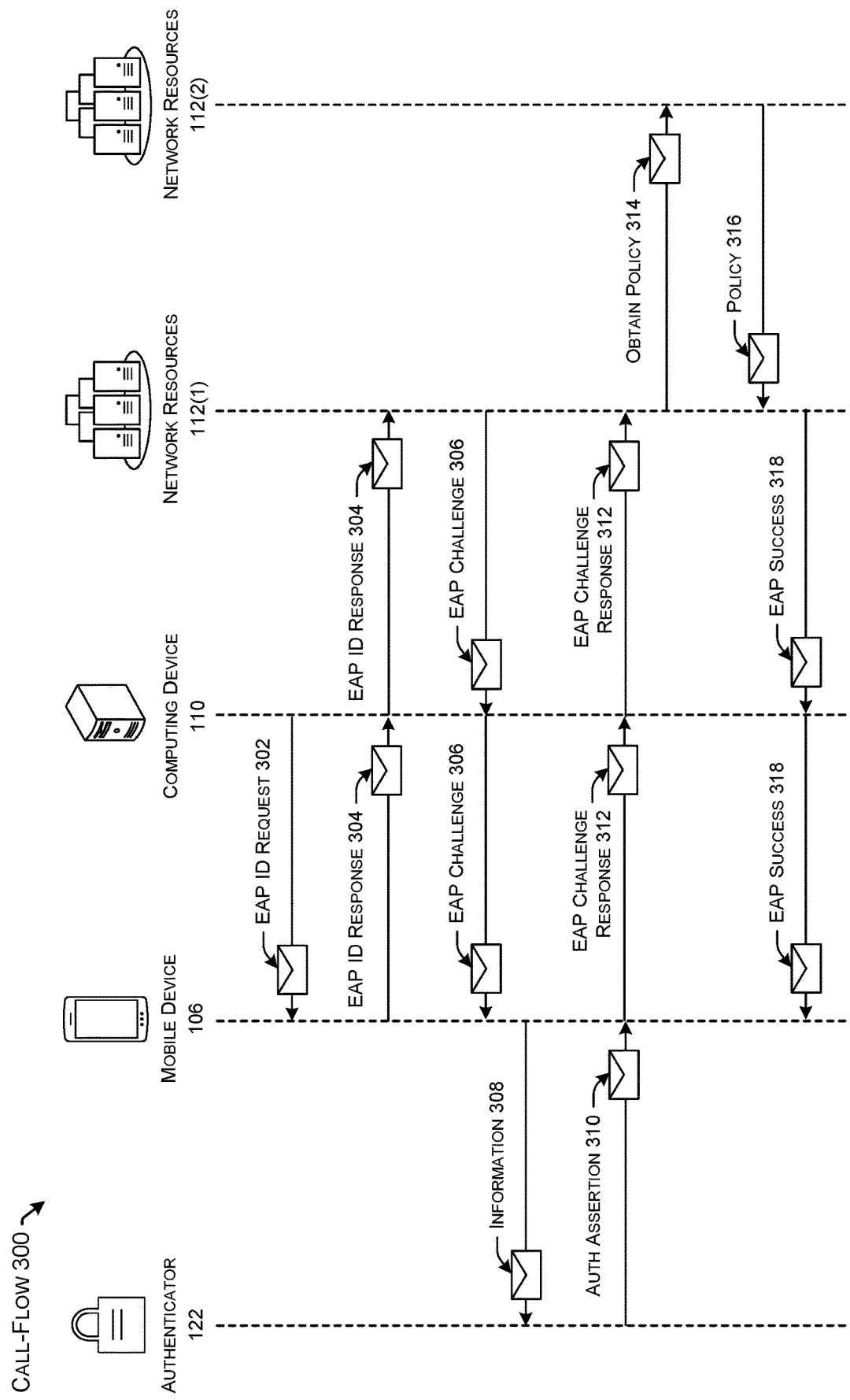

FIGS. 2 and 3 show example call-flows 200 and 300, respectively. The call-flows 200 and 300 may be associated with the present authentication concepts. FIG. 2 provides an illustration of a call-flow 200 associated with a registration process. FIG. 3 provides an illustration of a call-flow 300 associated with an authentication process. For illustration purposes, the example call-flows 200 and 300 are shown as occurring among devices depicted in the scenario from FIG. 1. Accordingly, some aspects of the examples shown in FIGS. 2 and 3 may be similar to aspects of the example described above relative to FIG. 1. Therefore, for sake of brevity, not all elements of FIGS. 2 and 3 will be described in detail.

In FIGS. 2 and 3, call-flows 200 and 300 may include communications among authenticator 122, mobile device 106, computing device 110, and network resources 112. In some cases, parentheticals are utilized after a reference number to distinguish like elements. Use of the reference number without the associated parenthetical is generic to the element. As such, FIGS. 2 and 3 include network resources 112(1) and network resources 112(2). Network resources 112(1) may be viewed as one or more devices that include an authentication, authorization, and accounting (AAA) server. Network resources 112(2) may be viewed as one or more devices that include a policy controller. In some implementations, the functions suggested for network resources 112(1) and network resources 112(2) may be performed by the same device or one or more different devices. The depictions of network resources shown in FIGS. 1-3 are not meant to be limiting. Similarly, the depiction of a single computing device 110 is not meant to be limiting; one or more computing devices 110 of enterprise network 108 may be involved with the operations and/or communications described relative to FIGS. 1-3.

For instance, referring to FIG. 1, during an on-boarding process for user 102 to join organization 104, user 102 may have been assigned (e.g., issued) mobile device 106. In other instances, user 102 may bring their own device to register. User 102 may use a browser on mobile device 106 to access a website associated with enterprise network 108 that is configured to help register mobile device 106 and/or user 102 with enterprise network 108. In other instances, an application that is associated with enterprise network 108 and configured to help with registration may be installed on mobile device 106. In some implementations, the registration process may be performed using a native EAP extension(s) over RADIUS. In other implementations, other protocols are contemplated.

As shown in FIG. 2, the example registration call-flow 200 begins with computing device 110 sending an EAP ID request 202 to mobile device 106. EAP ID request 202 may be received by an EAP supplicant at mobile device 106, for instance. EAP ID request 202 may be sent in response to user 102 engaging the website, or the application, etc. associated with registration. EAP ID request 202 may be viewed as an invitation for mobile device 106 to authenticate to enterprise network 108. Since user 102 has not yet registered mobile device 106 with enterprise network 108, user 102 may be asked to provide a username to enterprise network 108. In some examples, EAP ID request 202 may cause mobile device 106 to prompt user 102 for a username. A username may have been previously provided (e.g., assigned) to user 102. In other examples, user 202 may select a username.

In the example in FIG. 2, mobile device 106 replies to computing device 110 with EAP ID response 204. EAP ID response 204 may contain the username associated with user 102 (e.g., EAP ID response [username]). EAP ID response 204 may be forwarded to network resources 112(1) (e.g., the AAA server). Upon receiving EAP ID response 204, network resources 112(1) may determine that user 102, mobile device 106, and/or the username has not been or is not currently registered with enterprise network 108. For instance, network resources 112(1) may determine that no public key associated with user 102 is available, and conclude that user 102 is not registered.

In response to determining that user 102 (and/or mobile device 106 or the username) is not registered, network resources 112(1) may send EAP challenge 206 to computing device 110. EAP challenge 206 may contain information that can help advance the registration process. For instance, EAP challenge 206 may contain a flag that user 102 has not yet registered with enterprise network 108. EAP challenge 206 may also contain information about an enterprise domain (e.g., domain name) associated with enterprise network 108. In some examples, EAP challenge 206 may be represented as "EAP challenge [registration flag, enterprise domain]." Computing device 110 may forward EAP challenge 206 to mobile device 106.

Upon receiving EAP challenge 206, the EAP supplicant at mobile device 106 may prompt user 102 to input a credential (e.g., biometric) for registration. For example, the EAP supplicant may trigger a pop-up on mobile device 106 that triggers user 102 to input the credential. The trigger may be a request to select a credential type (e.g., fingerprint, iris, facial), followed by a request to make an input related to the selected credential type. The trigger may simply be a request for input related to a pre-selected credential type, etc. Regardless, user 102 may complete input of the credential. In some examples, the input of the credential by user 102 may unlock or otherwise activate authenticator 122 to participate in the registration process. For example, input by user 102 may be part of information 208 that is sent or provided from mobile device 106 to the local authenticator 122. Information 208 may include the username, the challenge from EAP challenge 206, the enterprise domain, a personal identification number (PIN), a pattern, a paraphrase, a challenge question, voice recognition, inserting and/or tapping a hardware security key, and/or any of a variety of other relevant security measures or devices.

Authenticator 122 may use information 208 to continue the registration process. In some implementations, authenticator 122 may generate a key pair (e.g., public key and private key) for user 102. The key pair may be unique to user 102. Authenticator 122 may also generate a credential ID. The credential ID may map the key pair to the enterprise domain, for instance. The credential ID may map what type of credential was used to the key pair. In some examples, a different credential ID may be generated for each type of biometric user 102 registers. The credential ID may be a raw ID for each authentication attempt, in some instances. Further, authenticator 122 may attest with the private key from the key pair. For instance, authenticator 122 may sign the challenge with the private key. Authenticator 122 may then provide signed challenge 210 to mobile device 106. Authenticator 122 may also provide various other information to mobile device 106, such as the public key, the credential ID, what type of credential is associated with the credential ID and/or key pair, an attestation associated with the signed challenge, etc. Note that in some examples, the private key remains locked in authenticator 122, and may never leave mobile device 106.

Mobile device may reply to computing device 110 with EAP challenge response 212. EAP challenge response 212 may include a variety of components that help enterprise network 108 and/or network resources 112(1) (e.g., the AAA server) to complete the registration process. For instance, EAP challenge response 212 may have a form represented by "EAP challenge response [public key, attestation, credential ID, credential type]." Stated another way, EAP challenge response 212 may include an indication of signed challenge 210. EAP challenge response 212 may be forwarded to network resources 112(1). Network resources 112(1) may perform various functions related to ensuring security related to the new user 102 and/or completing the registration process. In some examples, network resources 112(1) may verify the signature associated with the signed challenge. Network resources 112(1) may store the public key for future reference. Network resources 112(1) may also store the credential ID and/or the credential type. In some cases, network resources 112(1) may assign a secure group tag (SGT) to user 102 and/or to the credential ID. The SGT may be associated with a policy regarding network access. Assigning an SGT, determining a policy associated with the SGT, and/or applying the policy may require accessing information 214 at network resources 112(2) in some instances, indicated by a dashed, double arrow line.

Finally, network resources 112(1) may make a determination that the registration process is complete. Network resources 112(1) may send EAP success 216 to computing device 110 at enterprise network 108. EAP success 216 may indicate that network access has been granted to user 102 via mobile device 106. EAP success 216 may be forwarded to mobile device 106. EAP success 216 may trigger or otherwise allow mobile device 106 to join enterprise network 108. In some cases, EAP success 216 may include a request to reauthenticate the credential before the registration process is finalized.

In the example scenario illustrated in FIG. 3, user 102 is authenticating to enterprise network 108 after having registered. As shown in FIG. 3, the example authentication call-flow 300 begins with computing device 110 sending an EAP ID request 302 to mobile device 106. Note that some aspects of the example shown in FIG. 3 may be similar to aspects of the example described above relative to FIG. 2. Therefore, for sake of brevity, not all elements of FIG. 3 will be described in detail. In FIG. 3, EAP ID request 302 may be sent to mobile device 106 in response to user 102 requesting access via mobile device 106, in response to enterprise network 108 sensing the approach or arrival of mobile device 106, in response to mobile device 106 having been kicked off the network, but still within a geographic area of the enterprise network 108 and attempting to reauthenticate, etc.

Mobile device 106 may reply to computing device 110 with EAP ID response 304. EAP ID response 304 may contain the username and/or other user identification information associated with user 102 (described above relative to FIG. 2). In call-flow 300, since user 102 is already registered, mobile device 106 may automatically provide the username in EAP ID response 304 without interacting with user 102. In other cases, user 102 may be prompted to enter, select, or confirm the username and/or other user identification information to continue the authentication process. EAP ID response 304 may be forwarded to network resources 112(1) (e.g., the AAA server). Upon receiving EAP ID response 304, network resources 112(1) may determine that user 102 (and/or mobile device 106 and/or the username) is registered with enterprise network 108. For instance, network resources 112(1) may find a public key, a credential ID, and/or other data associated with and/or mapped to user 102. Note that network resources 112(1) may have acquired such data through the registration process (FIG. 2).

Network resources 112(1) may send EAP challenge 306 to computing device 110. In some examples, EAP challenge 306 may contain various information associated with the authentication process. For instance, EAP challenge 306 may be represented as "EAP challenge [challenge, enterprise domain, credential ID, credential type]." In some examples, EAP challenge 306 may include a request for a particular credential type. Network resources 112(1) may select the credential type in response to receiving EAP ID response 304 in some cases. Network resources 112(1) may communicate with network resources 112(2) (e.g., policy server) to determine a credential type associated with a particular level of access, for instance (not pictured). In other examples, more or less information may be included in EAP challenge 306, such as a credential type. Computing device 110 may forward EAP challenge 306 to mobile device 106.

Upon receiving EAP challenge 306, the EAP supplicant at mobile device 106 may prompt user 102 to input a credential (e.g., biometric, PIN, etc.). For example, the EAP supplicant may trigger a pop-up on mobile device 106 that triggers user 102 to input the credential. The trigger may be a request to select a credential type (e.g., fingerprint, iris, facial), followed by a request to make an input related to the selected credential type. The trigger may simply be a request for input related to the credential type that was used in the registration process (e.g., FIG. 2), etc. Regardless, user 102 may complete input of the credential. Entry of the credential may cause information 308 to be sent to authenticator 122, which may unlock authenticator 122 to participate in the authentication process. In some instance, authenticator 122 may only be unlocked with the same biometric that was already registered as associated with user 102 (i.e., the same fingerprint that was registered by user 102). Information 308 may further include the challenge from EAP challenge 306, the credential ID, the enterprise domain, and/or any of a variety of other relevant information. Note: a credential entered by user 102 to authenticate is not sent to network resources 112, for instance. In the instance of a PIN entered by user 102, mobile device 106 may include a secure microcontroller that may cryptographically compare the current PIN entered by user 102 to a previous PIN that user 102 entered when setting up mobile device 106 to support PIN authentication. If the current and previous PINS match, then authenticator 122 is unlocked to obtain client credentials, which may include a client ID, locally-stored key pair, etc.

Authenticator 122 may use information 308 to continue the authentication process. In some implementations, authenticator 122 may fetch the key pair for user 102. Authenticator 122 may be able to fetch the key pair using the credential ID in information 308, for instance. Authenticator 122 may also validate the enterprise domain. Further, authenticator 122 may generate an assertion that user 102 is authenticated. For instance, the assertion may include an indication that an identity of user 102 is verified with the biometric. Authenticator 122 may sign the assertion with the private key from the key pair. For instance, authenticator 122 may sign the challenge from EAP challenge 306 with the private key. Authenticator 122 may then provide authentication assertion 310 to mobile device 106. Authentication assertion 310 may be represented as "authentication assertion [authorization data, signature]," for instance. Authorization data may include any of a variety of information associated with the authentication process, such as the credential type used for authentication, information related to user 102, information about mobile device 106, location data for mobile device 106, etc.

Mobile device 106 may reply to computing device 110 with EAP challenge response 312. EAP challenge response 312 may include a variety of components that help enterprise network 108 and/or network resources 112(1) (e.g., the AAA server) to complete the authentication process. In some examples, EAP challenge response 312 may include credential information (e.g., biometric credential information) related to the credential used for authentication with authenticator 122, such as the credential ID, credential type, etc. For instance, EAP challenge response 312 may have a form represented by "EAP challenge response [authorization data, signature, credential ID, credential type]." Stated another way, EAP challenge response 312 may include an indication of authentication assertion 310, including a credential type used in the authentication, without sending the actual credential (e.g., the scan of the fingerprint) from mobile device 106. EAP challenge response 312 may be forwarded to network resources 112(1). Network resources 112(1) may perform various functions related to ensuring security related to the instance of network access in this scenario and/or completing the authentication process. Network resources 112(1) may fetch the public key associated with the credential key offered in EAP challenge response 312, for instance. In some examples, network resources 112(1) may verify the signature using the public key.

Once the authentication attempt has been verified, network resources 112(1) (e.g., AAA server) may work with network resources 112(2) (e.g., policy controller) to apply granular policies on the user session. For instance, network resources 112(1) may send obtain policy 314 to network resources 112(2), which may be a request for policy information related to the requested network access. Obtain policy 314 may include the username associated with user 102, the credential type used for authentication, a type of device used for authentication, etc. Network resources 112(2) may access policy information that allows network access, allows a level of network access, and/or allows access to a portion of enterprise network 108 based at least in part on the information included in obtain policy 314. For instance, the type of credential used for authentication may be associated with a particular SGT specifying a level of network access. The particular mobile device 106 used by user 102 to authenticate may determine the SGT applied. An SGT assigned to a user 102 may have changed since a previous authentication, specifying an updated level of network access. In one example, SGT "A" may be applied when user 102 enters a fingerprint, granting full network access, while SGT "B" is applied when user 102 enters a PIN, granting limited network access. Many scenarios in how a level of network access is determined are contemplated. Furthermore, the use of SGT in this scenario is not meant to be limiting; other forms of policy description and/or policy communication are contemplated. Network resources 112(2) may send policy 316 to network resources 112(1), which may include the applicable policy, SGT, and/or other information regarding a level of network access allowed.

Finally, network resources 112(1) may send EAP success 318 to computing device 110. EAP success 318 may include an indication that network access to enterprise network 108 has been granted to user 102 via mobile device 106. EAP success 318 may be forwarded to mobile device 106. EAP success 318 may trigger or otherwise allow mobile device 106 to join enterprise network 108. EAP success 318 may describe a level or degree of access, or other parameter related to the authentication to the enterprise network 108, that is dependent on the credential type that was used in the authentication process. In some cases, EAP success 318 may include a request to provide an additional credential type before access is granted. For instance, where a level of network access approved for a user 102 has changed since a previous authentication, a different and/or additional credential type may be requested. Further, network access to relatively highly confidential resources may require a particular credential type (e.g., more stringent) and/or more than one credential type. Note that where a credential type is needed that has not been previously registered in association with user 102, some or all of the registration process (e.g., FIG. 2) may be necessary to update a credential(s) associated with user 102 before network access is granted.

Figure 4:
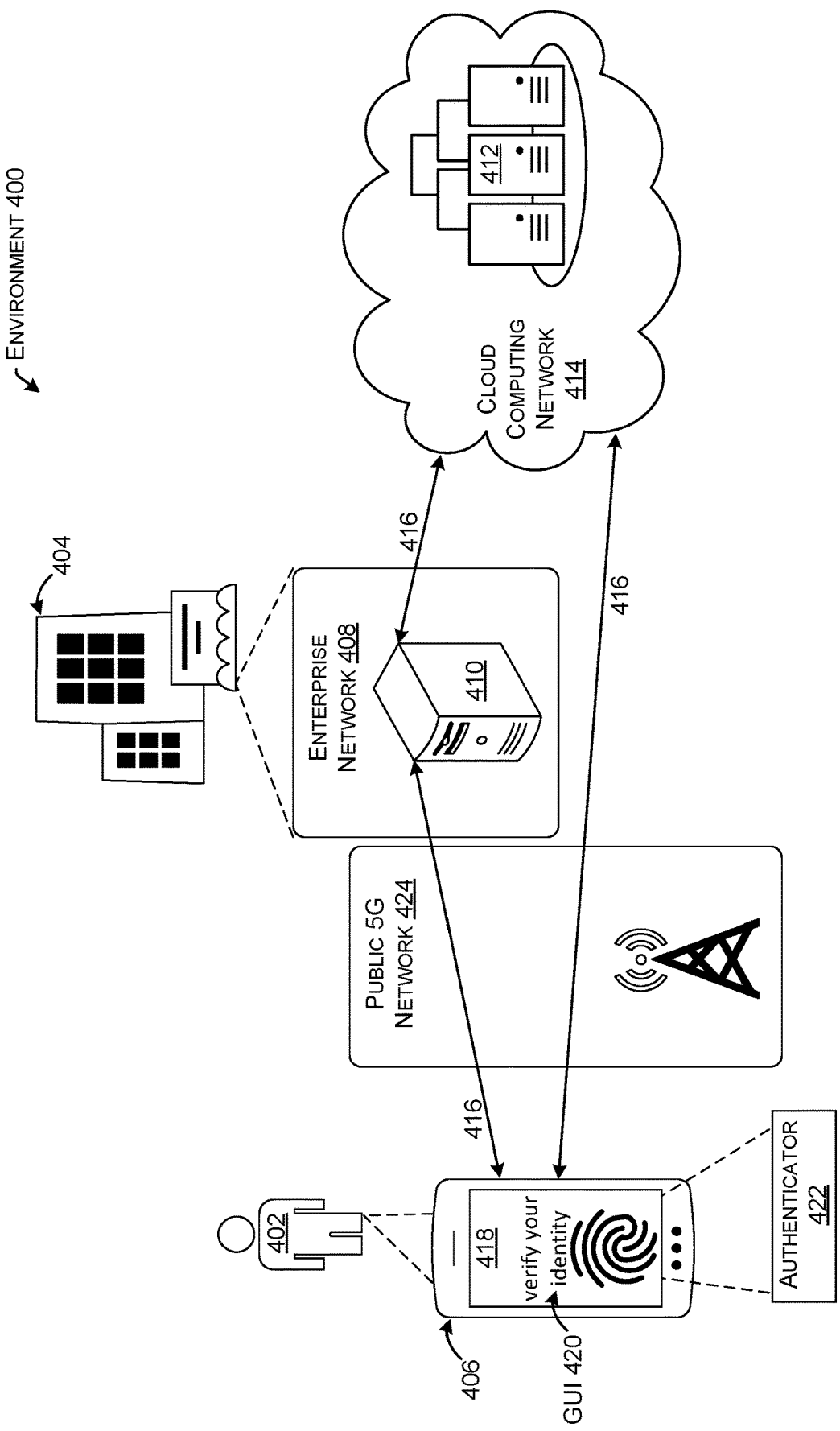

FIG. 4 illustrates an additional example environment 400 in accordance with the present authentication concepts. Example environment 400 may include a user 402 and an organization 404. In this scenario, the user 402 may wish to gain network access associated with organization 404, but may not necessarily be physically approaching organization 404 in terms of geographic location. For instance, user 402 may be an employee of organization 404 that is on a business trip away from the geographic location of organization 404. Some aspects of the example shown in FIG. 4 may be similar to aspects of the example described above relative to FIG. 1. Therefore, for sake of brevity, not all elements of FIG. 4 will be described in detail.

User 402 may be carrying a mobile device 406. Organization 404 may use an enterprise network 408 to provide digital services. Enterprise network 108 may be provided by one or more computing devices 410. Computing device 410 may be part of a WLAN infrastructure of enterprise network 408, for instance. Environment 400 may also include network resources 412 and cloud computing network 414. Network resources 412 may include a AAA server and/or a policy controller, for example. Mobile device 406, computing device 410, and/or network resources 412 may exchange communications (e.g., packets) via wired and/or wireless network connection(s), indicated by double arrows 416. Mobile device may include a display 418, which may present a GUI 420, such as: "verify your identity" with a fingerprint symbol. Mobile device may also include an authenticator 422 (e.g., HSM).

As shown in FIG. 4, example environment may also include public 5G network 424. In some examples, public 5G network 424 may represent a mobile broadband network. Public 5G network 424 may include a 5G service-based architecture (SBA) that operates using the concepts access and mobility management function (AMF), session management function (SMF), and user plane function (UPF), for instance. In the scenario depicted in FIG. 4, user 402 intends to authenticate to enterprise network 408 via mobile device 406. However, rather than directly connecting to enterprise network 408, user 402 would like to access enterprise network 408 via public 5G network 424, in this instance. Note that a communication path 416 may extend from mobile device 406 to computing device 410 via public 5G network 424, as shown in FIG. 4. Also, a communication path 416 may extend from mobile device 406 to cloud computing network 414 via public 5G network 424. Therefore, mobile device 406 may access a AAA server associated with enterprise network 408 at network resources 412 via public 5G network 424. Since mobile device 406 is authenticating to enterprise network 408 via public 5G network 424, the scenario depicted in FIG. 4 may be viewed as secondary authentication, rather than direct authentication (FIG. 1) from mobile device 406 to enterprise network 408. An example call-flow associated with password-less and/or biometric secondary authentication for network access over a public 5G network is described relative to FIG. 5.

Figure 5:
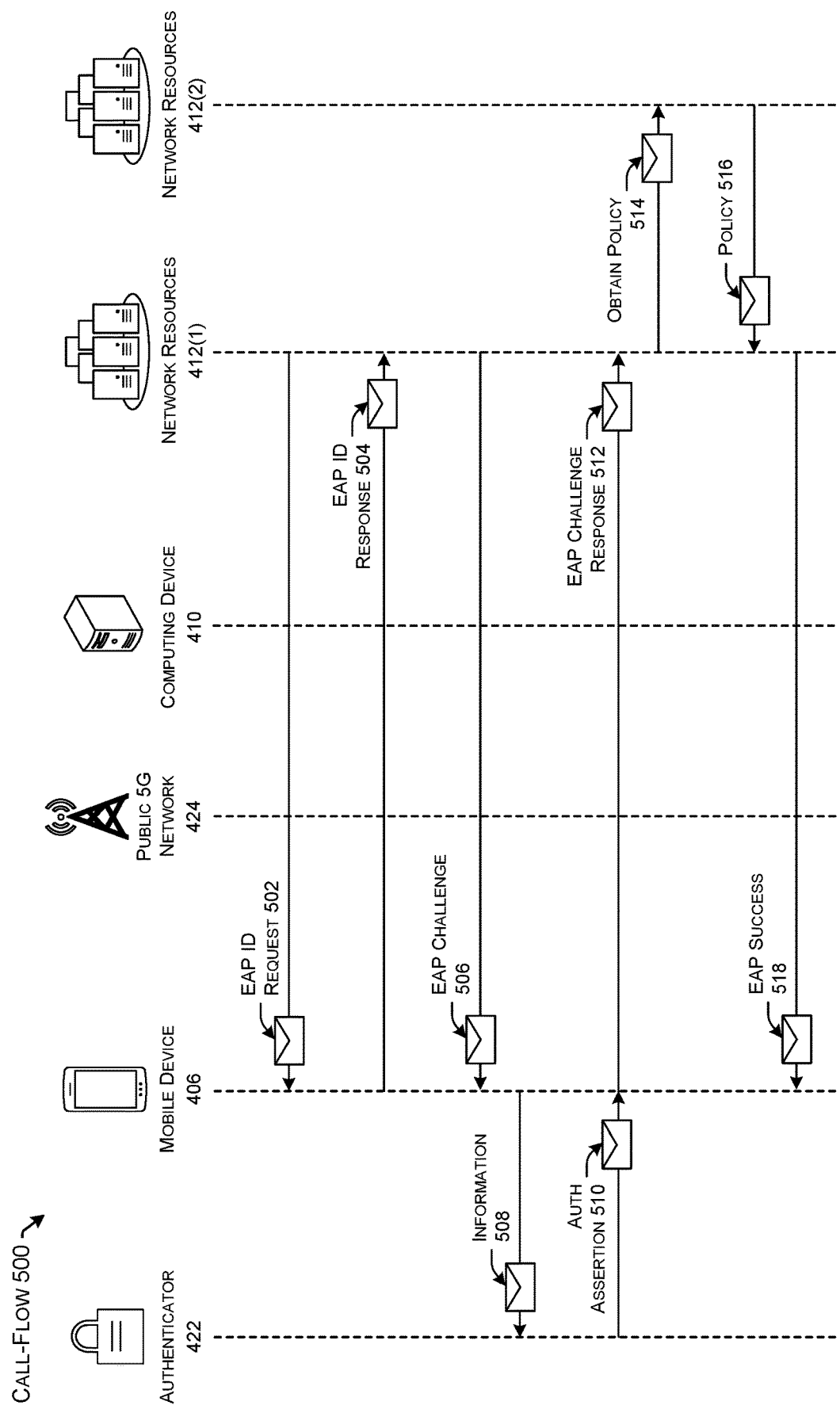

FIG. 5 shows an additional example call-flow 500 associated with the present authentication concepts. Example call-flow 500 is associated with an authentication process related to secondary authentication. More specifically, call-flow 500 may correspond to authentication over a public 5G network, such as public 5G network 424. Some aspects of the example shown in FIG. 5 may be similar to aspects of the examples described above relative to FIGS. 1-4. Therefore, for sake of brevity, not all elements of FIG. 5 will be described in detail.

As shown in FIG. 5, the example authentication call-flow 500 begins with network resources 412(1) (e.g., AAA server) sending an EAP ID request 502 to mobile device 406. Call-flow 500 may be viewed as corresponding to an example scenario in which user 402 is authenticating to enterprise network 408 after already having registered with enterprise network 408 (e.g., similar to the registration process described relative to FIG. 2). EAP ID request 502 may be sent in response to user 402 engaging a website or application associated with enterprise network 408 (FIG. 4). In some examples, network resources 412(1) may recognize that the request to access enterprise network 408 was channeled through public 5G network 424, rather than mobile device 406 directly accessing enterprise network 408. Accordingly, EAP ID request 502 is sent to mobile device 406 via computing device 410 (associated with enterprise network 108) and public 5G network 424. Note that in other examples, network resources 412(1) may recognize that mobile device 406 is remote from computing device 410, and may send EAP ID request 502 to mobile device 406 via public 5G network 424 without passing through computing device 410.

Upon receiving EAP ID request 502 via public 5G network 424, mobile device 406 may reply with EAP ID response 504, again via public 5G network 424 and forwarding by computing device 410, in this example. EAP ID response 504 may contain a username associated with user 402 and/or other information for identifying user 402 and/or locating data relevant to user 402. Upon receiving EAP ID response 504, network resources 412(1) may determine that user 402 (and/or mobile device 406 and/or the username) is registered with enterprise network 408. For instance, network resources 412(1) may find a public key, a credential ID, and/or other data associated with and/or mapped to user 402.

Network resources 412(1) may send EAP challenge 506 to mobile device 406. Since the scenario shown in FIG. 5 relates to secondary authentication over public 5G network 424, additional security measures may be used. For instance, rather than generating a challenge that includes previously stored information relevant to user 402, network resources 412(1) may generate a unique challenge for the current authentication instance to send over the public network. Recall in the description relative to FIG. 3, the EAP challenge 306 may have included such information as a credential ID and credential type associated with user 102. However, referring again to FIG. 5, network resources 412(1) may determine that the authentication attempt in the current instance is passing through public 5G network 424, and respond by generating a unique challenge that has less chance of revealing confidential information about user 402 and/or enterprise network 408. For instance, EAP challenge 506 may not include a signed assertion from a previous authentication. In some examples, EAP challenge 506 may be sent over RADIUS Access Challenge to SMF of public 5G network 424. The SMF may in turn deliver the EAP challenge 506 to the EAP supplicant at mobile device 406 over non-access stratum (NAS) signaling, for instance. The EAP supplicant at mobile device 406 may provide the challenge to authenticator 422 as part of information 508.

Upon receiving information 508, authenticator 422 may validate the challenge. For instance, authenticator 422 may validate that the challenge originated at network resources 412(1) (e.g., the AAA server). Authenticator 422 may verify the identity of user 402, such as by prompting user 402 for input (e.g., a biometric, a PIN, or other entry at mobile device 406). The particular credential type (or multiple credential types) requested may have been suggested by network resources 412(1) in the challenge. Once authenticator 422 is satisfied that the challenge originated at network resources 412(1) and/or that the identity of user 402 is verified, authenticator 422 may proceed with the authentication process. In some examples, authenticator 422 may sign an attestation of the challenge originating at network resources 412(1) and/or the identity of user 402. Authenticator 422 may sign the attestation using a previously-stored private key of a key pair generated during registration of mobile device 406 with enterprise network 408, for instance. Authenticator 422 may send the signed attestation to the EAP supplicant of mobile device 406, as authentication assertion 510. Note that the private key may never leave the authenticator 422 device. Authentication assertion 510 may include any of a variety of information associated with the authentication process, such as the credential type used for authentication, information related to user 402, information about mobile device 406, etc.

Mobile device 406 may reply to network resources 412(1) with EAP challenge response 512 via public 5G network 424. EAP challenge response 512 may include a variety of components that help network resources 412(1) (e.g., the AAA server) to complete the authentication process, including an indication of authentication assertion 510. For instance, EAP challenge response 512 may have a form represented by "EAP challenge response [authorization data, signature, credential ID, credential type]." In some examples, the EAP supplicant at mobile device 406 may send EAP challenge response 512 to SMF over NAS signaling. The SMF may relay the EAP challenge response 512 to network resources 412(1) using RADIUS Access Request, for instance.

Network resources 412(1) may perform various functions related to ensuring security related to the instance of network access in this scenario and/or completing the authentication process. Network resources 412(1) may fetch the public key associated with the credential key offered in EAP challenge response 512, for instance. In some examples, network resources 412(1) may verify the signature using the public key.

Once the authentication attempt has been verified, network resources 412(1) (e.g., AAA server) may work with network resources 412(2) (e.g., policy controller) to apply granular policies on the user session. For instance, network resources 412(1) may send obtain policy 514 to network resources 412(2), which may be a request for policy information related to the requested network access. Network resources 412(2) may access policy information that specifies parameters regarding access by user 402 and/or mobile device 406 to enterprise network 408. In some examples, a level of network access may be adjusted based on mobile device 406 accessing enterprise network 408 via public 5G network 424. For instance, a lower level of access to enterprise network 408 may be granted via public 5G network 424. In another instance, an additional and/or relatively more stringent credential type may be requested of user 402 for access to enterprise network 408 to be granted via public 5G network 424. Network resources 412(2) may send policy 516 to network resources 412(1), which may include the applicable policy and/or other information regarding a level of network access allowed.

Finally, network resources 412(1) may send EAP success 518 to mobile device 406 (e.g., to the EAP supplicant). EAP success 518 may be sent via SMF over public 5G network 424, for instance. EAP success 518 may indicate that network access has been granted to user 402 and/or mobile device 406. In some cases, an indication that network access has been granted to user 402 and/or mobile device 406 may also be sent to enterprise network 408. For instance, EAP success 518 may be received by computing device 410 and forwarded to mobile device 406.

To summarize, the scenarios illustrated in FIGS. 1-5 show how the authentication techniques described herein may improve network security and/or operations by allowing native integration of biometric authentication to provide network access. The techniques include new AVPs in EAP communications which may work over virtually any type of network access (e.g., Wi-Fi, private or public LTE/5G, secondary authentication). The techniques may give a AAA or other enterprise network server visibility of a credential type used by the user for authentication, and allow the enterprise network server to apply granular policies accordingly. Furthermore, the enterprise network server may be able to request an additional or alternative credential(s), and/or request MFA with a secondary device. Therefore, the present techniques greatly improve the enterprise network server understanding of exactly who is requesting the network access.

Furthermore, although the scenarios in FIGS. 1-5 are described relative to authentication to an enterprise network, note that the techniques may apply to additional and/or more complex scenarios, such as: use of the authentication techniques based on EAP extensions to access any technology that supports EAP-based authentication methods (e.g., primary authentication for Wi-Fi, private 5G networks, etc.); use of the authentication techniques as a secondary authentication, in addition to a primary access authentication method based on classic authentication methods; use of the authentication techniques as a secondary authentication to an enterprise domain (e.g., via 5G), after a primary authorization to a 5G and/or SP domain based on standard subscriber identity module (SIM) technology; etc.

Figure 6:
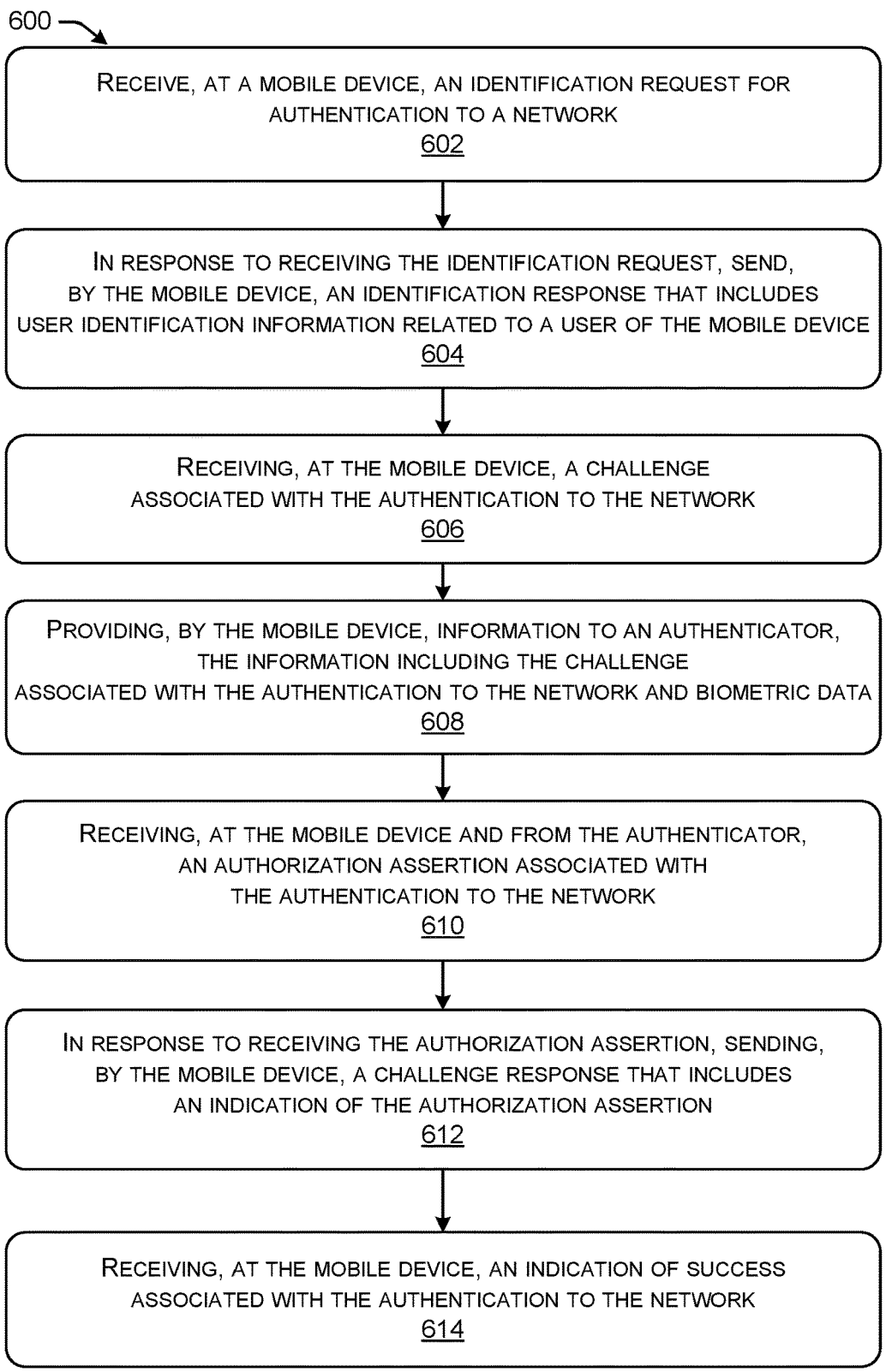
FIGS. 6-8 illustrate flow diagrams of example methods for the use of authentication techniques among mobile device(s) and network device(s), in accordance with the present concepts.
Figure 7:
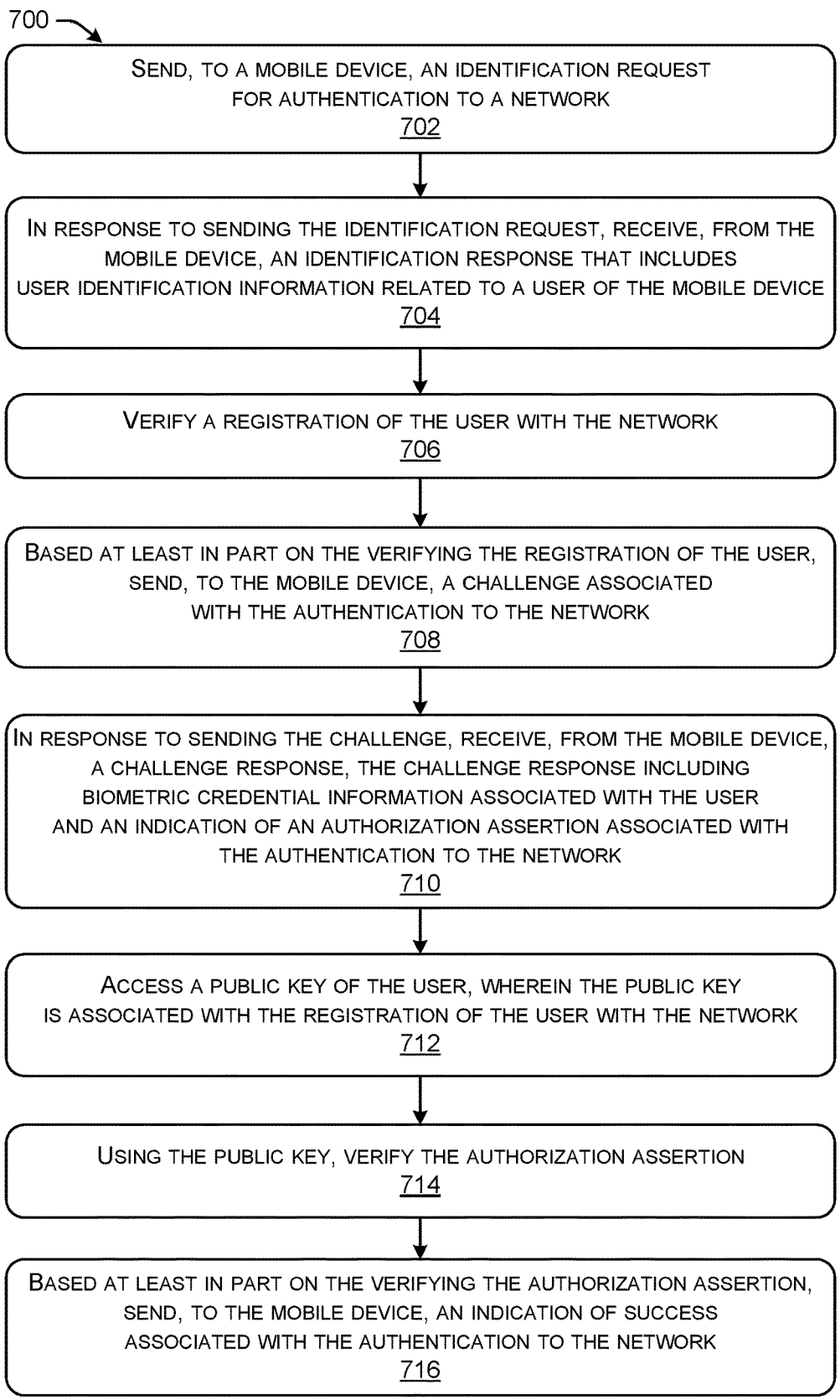
Figure 8:
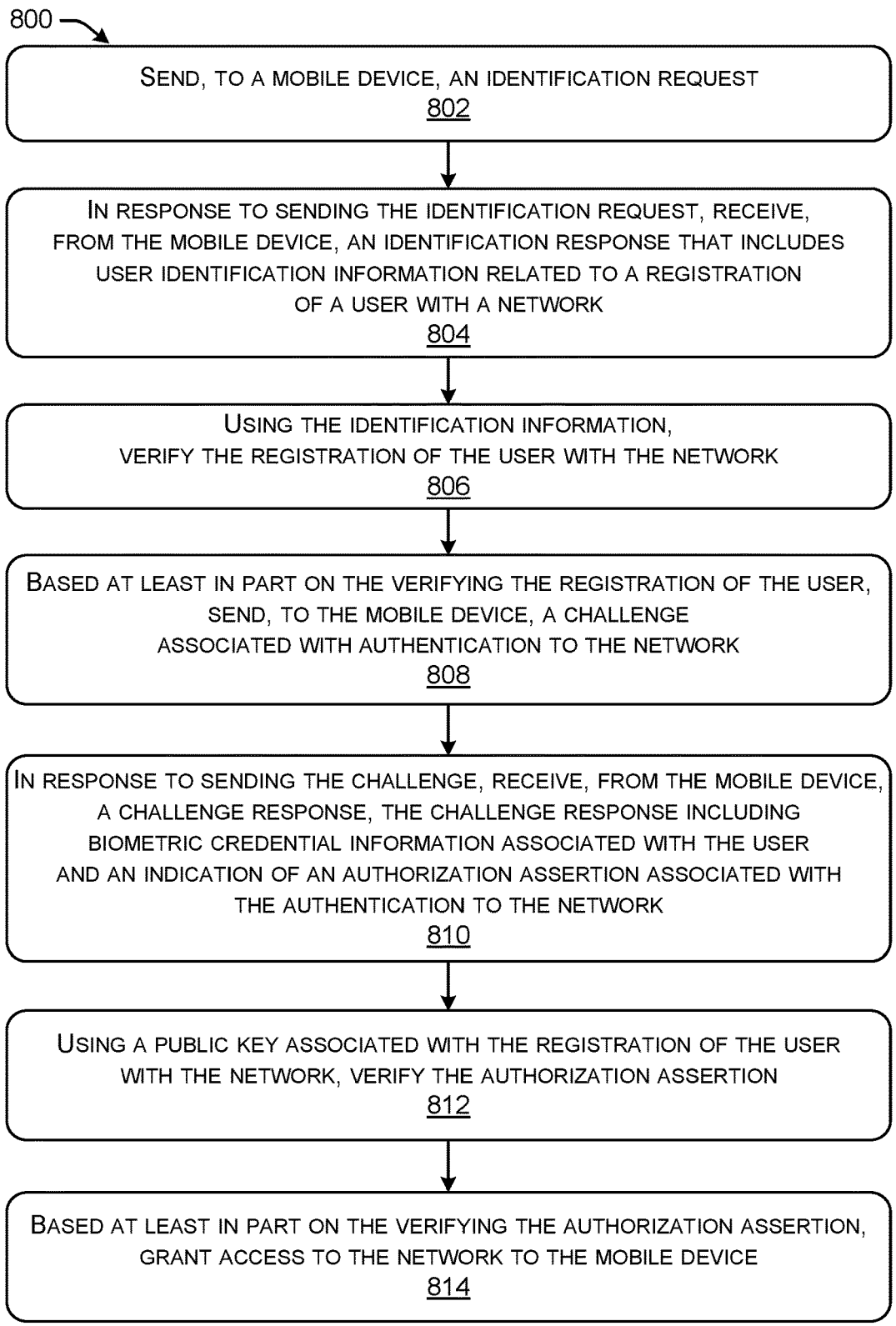

FIGS. 6-8 illustrate flow diagrams of example methods 600, 700, and 800 that include functions that may be performed at least partly by a mobile device, a computing device, and/or devices associated with network resources, such as mobile devices 106 or 406, or network resources 112 or 412 described relative to FIGS. 1-5. The logical operations described herein with respect to FIGS. 6-8 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 6-8 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 6 illustrates a flow diagram of an example method 600 for a mobile device to perform authentication techniques. Method 600 may be performed by a mobile device (e.g., mobile device 106 or 406) communicatively coupled to a computing device and/or network resources (e.g., computing devices 110 or 410 or network resources 112 or 412), for instance. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may include receiving, at the mobile device, an identification request for authentication to a network. In some examples, the network may be an enterprise network. The identification request for authentication may be received at the mobile device from a computing device of the enterprise network, for instance.

At 604, in response to receiving the identification request, method 600 may include sending, by the mobile device, an identification response. In some examples, the identification response may include user identification information. The user identification information may be related to a user of the mobile device. For instance the user identification information may comprise a username associated with the user. In some implementations, the user identification information may be associated with a registration of the user with an enterprise network.

At 606, method 600 may include receiving, at the mobile device, a challenge associated with the authentication to the network.

At 608, method 600 may include providing, by the mobile device, information to an authenticator. The information may include the challenge associated with the authentication to the network, for instance. In some examples, the information may also include biometric data. The biometric data may comprise information relating to a biometric identity verification of the user, for instance.

At 610, method 600 may include receiving, at the mobile device and from the authenticator, an authorization assertion associated with the authentication to the network.

At 612, in response to receiving the authorization assertion, method 600 may include sending, by the mobile device, a challenge response. In some examples, the challenge response may include an indication of the authorization assertion. Further, the challenge response may include a credential type of the biometric data. For instance, the credential type may be one or more of a fingerprint scan, a facial scan, an iris scan, voice recognition, or any other type of biometric credential for identifying the user of the mobile device. The challenge response may be sent via extensible authentication protocol (EAP) by an EAP supplicant of the mobile device, in some cases.

At 614, method 600 may include receiving, at the mobile device, an indication of success associated with the authentication to the network. In some examples, a parameter of the authentication to the network may be dependent on the credential type. For instance, a level of access granted to the mobile device may be dependent on the credential type.

FIG. 7 illustrates a flow diagram of an example method 700 for network resources (e.g., server device, computing device) to perform authentication techniques. Method 700 may be performed by network resources (e.g., network resources 112 or 412) communicatively coupled to a computing device and/or mobile device (e.g., computing devices 110 or 410 or mobile device 106 or 406), for instance. In some examples, method 700 may be performed by a computing device comprising one or more processors and one or more non-transitory computer-readable media storing computer-executable instructions that, when executed by the one or more processors, cause the one or more processors to perform method 700.

At 702, method 700 may include sending, to a mobile device, an identification request for authentication to a network. In some examples, the network may be an enterprise network. For instance, the challenge may be forwarded from the network resources to the mobile device via a computing device of the enterprise network. In other examples, the challenge may be sent from the network resources to the mobile device via a public 5G network, or other public network.

At 704, in response to sending the identification request, method 700 may include receiving, from the mobile device, an identification response. The identification response may include user identification information related to a user of the mobile device, for instance.

At 706, method 700 may include verifying a registration of the user with the network. For instance, the user may have previously registered an account with the network. The method may include accessing stored information related to the registration of the user, such as confirming the identification information (e.g., username) of the user.

At 708, based at least in part on the verifying the registration of the user, method 700 may include sending, to the mobile device, a challenge associated with the authentication to the network. The challenge may specify a credential type of biometric credential information requested to be included in a challenge response, in some cases.

At 710, in response to sending the challenge, method 700 may include receiving, from the mobile device, a challenge response. In some examples, the challenge response may include biometric credential information associated with the user. The biometric credential information in the challenge response may be consistent with a credential type specified in the challenge, in some cases. For instance, the credential type specified in the challenge may have been a fingerprint scan, and the biometric credential information may correspond to a fingerprint scan completed by the user of the mobile device. The challenge response may also include an indication of an authorization assertion associated with the authentication to the network.

At 712, method 700 may include accessing a public key of the user. For instance, the public key may have been previously stored in association with the registration of the user with the network.

At 714, method 700 may include verifying the authorization assertion. For instance, the public key may be used to verify the authorization assertion, such as by checking a signature of the authorization assertion with the public key. In some examples, method 700 may further include sending, to a policy controller, a policy request relating to the authentication to the network. The policy request may include the biometric credential information. Method 700 may further include receiving, from the policy controller, policy information regarding a level of access granted to the network based on the biometric credential information. For instance, a relatively higher level of network access may be granted for a particular credential type. A higher level of access may be associated with less restrictions on the network access, access to more confidential information and/or areas of the network, etc. The higher level of access may correspond to more stringent and/or secure credential types. The higher level of access may correspond to using multiple credential types and/or MFA in which the user enters a credential on a second device.

At 716, based at least in part on the verifying the authorization assertion, method 700 may include sending, to the mobile device, an indication of success associated with the authentication to the network. In some examples, the indication of success may simply be that the mobile device is logged onto the network.

FIG. 8 illustrates a flow diagram of an example method 800 for network resources (e.g., server device, computing device) to perform authentication techniques. Method 800 may be performed by network resources (e.g., network resources 112 or 412) communicatively coupled to a computing device and/or mobile device (e.g., computing devices 110 or 410 or mobile device 106 or 406), for instance. In some examples, method 800 may be performed by a computing device comprising one or more processors and one or more non-transitory computer-readable media storing computer-executable instructions that, when executed by the one or more processors, cause the one or more processors to perform method 800.

At 802, method 800 may include sending, to a mobile device, an identification request.

At 804, in response to sending the identification request, method 800 may include receiving, from the mobile device, an identification response. identification response may include user identification information related to a registration of a user with a network.

At 806, method 800 may include verifying the registration of the user with the network. Verification of the registration may include use of the identification information.

At 808, based at least in part on the verifying the registration of the user, method 800 may include sending, to the mobile device, a challenge associated with authentication to the network.

At 810, in response to sending the challenge, method 800 may include receiving, from the mobile device, a challenge response. The challenge response may include biometric credential information associated with the user and/or an indication of an authorization assertion associated with the authentication to the network.

At 812, method 800 may include verifying the authorization assertion. Verification of the authorization assertion may include use of a public key associated with the registration of the user with the network. In some examples, method 800 may further include sending, to the mobile device, a second challenge specifying a second credential type for authentication to the network. The second challenge may be based on the biometric credential information. For instance, the biometric credential information may be inadequate for a level of network access being requested, or parameters associated with the registration of the user may have changed since a precious authentication of the user to the network. Therefore, a new or additional credential may be requested from the user. Method 800 may further include receiving, from the mobile device, a second challenge response, the second challenge response including a second authorization assertion. In some examples, the granting of network access to the mobile device may be based on both the original authorization assertion from the mobile device and the second authorization assertion. In other instances, method 800 may include sending a second challenge to a second mobile device, or other second device associated with the user. Method 800 may include receiving a second challenge response from the second mobile device, and once again the granting of network access to the mobile device may be based on both the original authorization assertion from the mobile device and a second authorization assertion from the second device associated with the user.

At 814, based at least in part on the verifying the authorization assertion, method 800 may include granting access to the network to the mobile device. In some examples, granting network access to the mobile device may include applying a policy associated based on the biometric credential information.

Figure 9:
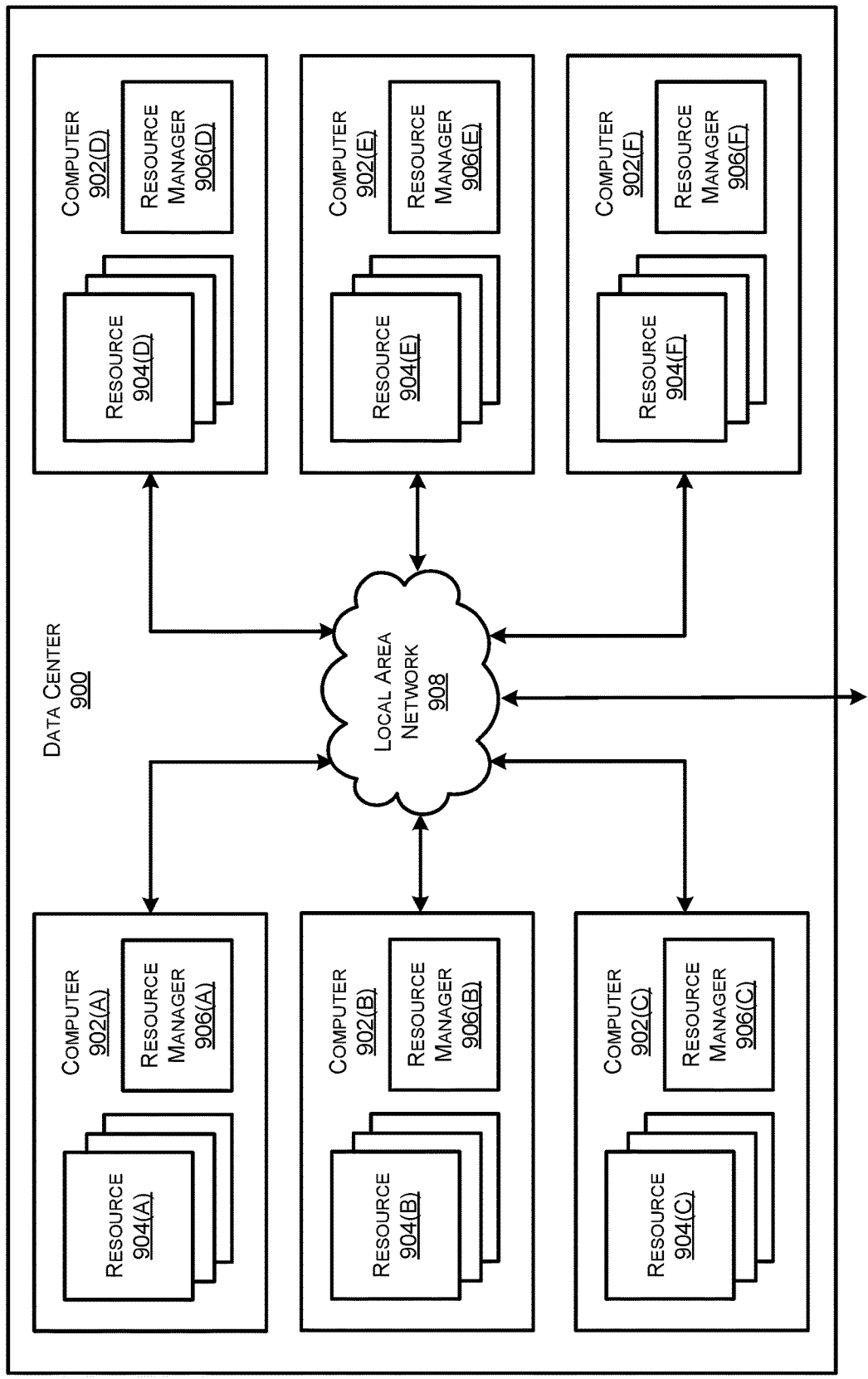
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement aspects of the technologies disclosed herein. The example data center 900 shown in FIG. 9 includes several computers 902A-902F (which might be referred to herein singularly as "a computer 902" or in the plural as "the computers 902") for providing computing resources. In some examples, the resources and/or computers 902 may include, or correspond to, any type of networked device described herein, such as a computing device (110 or 410) of an enterprise network (108 or 408), network resources (112 or 412) of a cloud computing network (114 or 414), and/or a mobile device (106 or 406). Although, computers 902 may comprise any type of networked device, such as servers, switches, routers, hubs, bridges, gateways, modems, repeaters, access points, hosts, etc.

The computers 902 can be standard tower, rack-mount, or blade server computers configured appropriately for providing computing resources. In some examples, the computers 902 may provide computing resources 904 including data processing resources such as virtual machine (VM) instances or hardware computing systems, database clusters, computing clusters, storage clusters, data storage resources, database resources, networking resources, and others. Some of the computers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single computer 902. Computers 902 in the data center 900 can also be configured to provide network services and other types of services.

In the example data center 900 shown in FIG. 9, an appropriate local area network (LAN) 908 is also utilized to interconnect the computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 900, between each of the computers 902A-902F in each data center 900, and, potentially, between computing resources in each of the computers 902. It should be appreciated that the configuration of the data center 900 described with reference to FIG. 9 is merely illustrative and that other implementations can be utilized.

In some examples, the computers 902 may each execute one or more application containers and/or virtual machines to perform techniques described herein. For instance, the containers and/or virtual machines may serve as server devices, user devices, and/or routers in the enterprise network 108 or 408, or in the cloud computing network 114 or 414.

In some instances, the data center 900 may provide computing resources, like application containers, VM instances, and storage, on a permanent or an as-needed basis. Among other types of functionality, the computing resources provided by a cloud computing or other network may be utilized to implement the various services and techniques described above. The computing resources 904 provided by the computing network can include various types of computing resources, such as data processing resources like application containers and VM instances, data storage resources, networking resources, data communication resources, network services, and the like.

Each type of computing resource 904 provided by the computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The computing network can also be configured to provide other types of computing resources 904 not mentioned specifically herein.

The computing resources 904 provided by a computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below with regard to FIG. 10.

Figure 10:
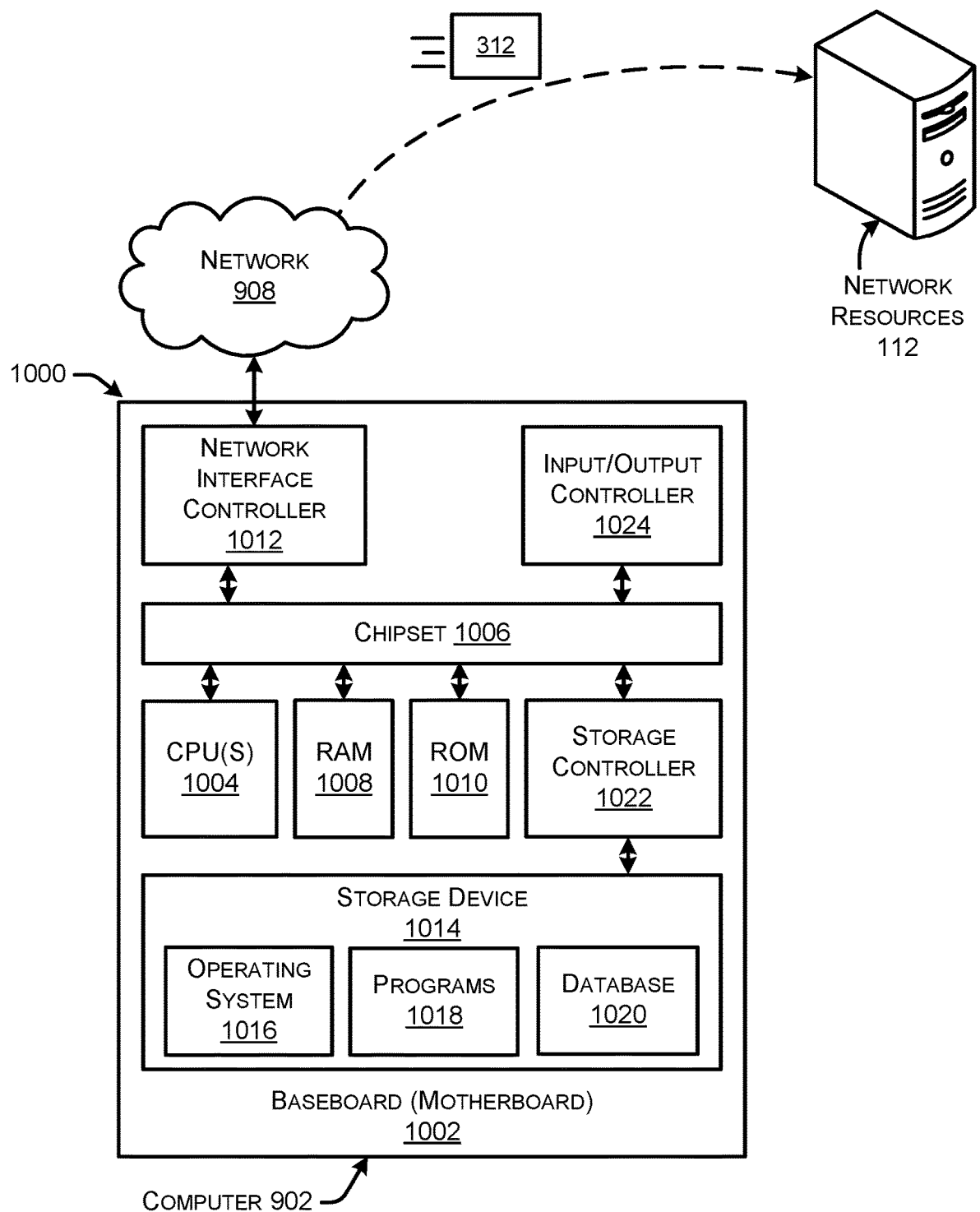
FIG. 10 is a computer architecture diagram showing an illustrative computer hardware architecture for implementing a device that can be utilized to implement aspects of the various technologies presented herein.

FIG. 10 shows an example computer architecture 1000 for a computer 902 capable of executing program components for implementing the functionality described above. The computer architecture 1000 shown in FIG. 10 illustrates a conventional server computer, workstation, desktop computer, laptop, tablet, network appliance, e-reader, smartphone, and/or other computing device, and can be utilized to execute any of the software components presented herein. The computer 902 may, in some examples, correspond to a physical device described herein (e.g., mobile device, server device, user device, router, etc.), and may comprise networked devices such as servers, switches, routers, hubs, bridges, gateways, modems, repeaters, access points, etc. For instance, computer 902 may correspond to mobile device 106 or 406 and/or computing device 110 or 410.

As shown in FIG. 10, the computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the networks 108, 114, 408, 414, and/or 908. The chipset 1006 can include functionality for providing network connectivity through a network interface controller (NIC) 1012, such as a gigabit Ethernet adapter. The NIC 1012 is capable of connecting the computer 902 to other computing devices over the network 908. For instance, in the example shown in FIG. 10, NIC 1012 may help facilitate transfer of data, packets, and/or communications, such as EAP communications (e.g., EAP challenge response 312, FIG. 3) over the network 908 with network resources 112. It should be appreciated that multiple NICs 1012 can be present in the computer 902, connecting the computer to other types of networks and remote computer systems.

The computer 902 can be connected to a storage device 1014 that provides non-volatile storage for the computer. The storage device 1014 can store an operating system 1016, programs 1018, credential IDs, key pairs, data relating to credential types, attestations, assertions, signatures, elements of EAP or other communications, and/or other data. The storage device 1014 can be connected to the computer 902 through a storage controller 1022 connected to the chipset 1006, for example. The storage device 1014 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1014 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1014 is characterized as primary or secondary storage, and the like.

For example, the computer 902 can store information to the storage device 1014 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1014 by detecting the physical states or characteristics of one or more particular locations within the physical storage units.

In addition to the mass storage device 1014 described above, the computer 902 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 902. In some examples, the operations performed by the network 908, and or any components included therein, may be supported by one or more devices similar to computer 902. Stated otherwise, some or all of the operations performed by the network 908, and or any components included therein, may be performed by one or more computer devices 902 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 1014 can store an operating system 1016 utilized to control the operation of the computer 902. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1014 can store other system or application programs and data utilized by the computer 902.

In one embodiment, the storage device 1014 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above with regard to FIGS. 1-9. The computer 902 can also include computer-readable storage media having instructions stored thereupon for performing any of the other computer-implemented operations described herein.

The computer 902 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

As described herein, the computer 902 may comprise one or more devices, such as mobile device 106 or 406 and/or computing device 110 or 410, and/or other devices. The computer 902 may include one or more hardware processors 1004 (processors) configured to execute one or more stored instructions. The processor(s) 1004 may comprise one or more cores. Further, the computer 902 may include one or more network interfaces configured to provide communications between the computer 902 and other devices, such as the communications described herein relative to FIGS. 2, 3, and 5. In some examples, the communications may include data, packets, credential IDs, public keys, data relating to credential types, attestations, assertions, signatures, elements of EAP or other communications, authorization date, policies, SGTs, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1018 may comprise any type of programs or processes to perform the techniques described in this disclosure in accordance with authentication techniques. For instance, the programs 1018 may cause the computer 902 to perform techniques for communicating with other devices using any type of protocol or standard usable for determining connectivity. Additionally, the programs 1018 may comprise instructions that cause the computer 902 to perform the authentication techniques described herein, such as using biometric technology to authenticate to an enterprise network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
receiving, at a mobile device, an identification request for authentication to a network;
in response to receiving the identification request, sending, by the mobile device, an identification response that includes user identification information related to a user of the mobile device;
receiving, at the mobile device, a challenge associated with the authentication to the network;
providing, by the mobile device, information to an authenticator, the information including the challenge associated with the authentication to the network and biometric data;
receiving, at the mobile device and from the authenticator, an authorization assertion associated with the authentication to the network;
in response to receiving the authorization assertion, sending, by the mobile device, a challenge response that includes an indication of the authorization assertion; and
receiving, at the mobile device, an indication of success associated with the authentication to the network.

2. The computer-implemented method of claim 1, wherein the network is an enterprise network, and the identification request for authentication is received at the mobile device from a computing device of the enterprise network.

3. The computer-implemented method of claim 2, wherein the user identification information is associated with a registration of the user with the enterprise network.

4. The computer-implemented method of claim 3, wherein the biometric data comprises information relating to a biometric identity verification of the user.

5. The computer-implemented method of claim 1, wherein the challenge response is sent via extensible authentication protocol (EAP) by an EAP supplicant of the mobile device.

6. The computer-implemented method of claim 1, wherein the challenge response includes a credential type of the biometric data.

7. The computer-implemented method of claim 6, wherein a parameter of the authentication to the network is dependent on the credential type.

8. The computer-implemented method of claim 7, wherein the credential type is a fingerprint scan, facial scan, iris scan, or voice recognition.

9. A network resources system comprising:
one or more processors; and
one or more non-transitory computer-readable media storing computer-executable instructions that, when executed by the one or more processors, cause the one or more processors to:
send, to a mobile device, an identification request for authentication to a network;
in response to sending the identification request, receive, from the mobile device, an identification response that includes user identification information related to a user of the mobile device;

verify a registration of the user with the network;

based at least in part on the verifying the registration of the user, send, to the mobile device, a challenge associated with the authentication to the network;

in response to sending the challenge, receive, from the mobile device, a challenge response, the challenge response including biometric credential information associated with the user and an indication of an authorization assertion associated with the authentication to the network;

access a public key of the user, wherein the public key is associated with the registration of the user with the network;

using the public key, verify the authorization assertion; and based at least in part on the verifying the authorization assertion, send, to the mobile device, an indication of success associated with the authentication to the network.

10. The network resources system of claim 9, wherein the network is an enterprise network, and the challenge is sent to the mobile device via a computing device of the enterprise network.

11. The network resources system of claim 9, wherein the challenge is sent to the mobile device via a public 5G network.

12. The network resources system of claim 9, wherein the challenge specifies a credential type of the biometric credential information to be included in the challenge response.

13. The network resources system of claim 12, wherein the biometric credential information in the challenge response is consistent with the credential type specified in the challenge.

14. The network resources system of claim 13, wherein the credential type comprises a fingerprint scan and the biometric credential information corresponds to a fingerprint scan.

15. The network resources system of claim 9, wherein the computer-executable instructions further cause the one or more processors to:

send, to a policy controller, a policy request relating to the authentication to the network, the policy request including the biometric credential information.

16. The network resources system of claim 15, wherein the computer-executable instructions further cause the one or more processors to:

receive, from the policy controller, policy information regarding a level of access granted to the network based on the biometric credential information.

17. A method comprising:

sending, to a mobile device, an identification request;

in response to sending the identification request, receiving, from the mobile device, an identification response that includes user identification information related to a registration of a user with a network;

using the identification information, verifying the registration of the user with the network;

based at least in part on the verifying the registration of the user, sending, to the mobile device, a challenge associated with authentication to the network;

in response to sending the challenge, receiving, from the mobile device, a challenge response, the challenge response including biometric credential information associated with the user and an indication of an authorization assertion associated with the authentication to the network;

using a public key associated with the registration of the user with the network, verifying the authorization assertion; and based at least in part on the verifying the authorization assertion, granting access to the network to the mobile device.

18. The method of claim 17, further comprising:

based on the biometric credential information, sending, to the mobile device, a second challenge specifying a second credential type for authentication to the network; and receiving, from the mobile device, a second challenge response, the second challenge response including a second authorization assertion, wherein the granting access to the mobile device is based on both the authorization assertion and the second authorization assertion.

19. The method of claim 17, further comprising:

based on the biometric credential information, sending, to a second mobile device, a second challenge specifying a second credential type for authentication to the network; and receiving, from the second mobile device, a second challenge response, the second challenge response including a second authorization assertion, wherein the granting the access to the mobile device is based on both the authorization assertion from the mobile device and the second authorization assertion from the second mobile device.

20. The method of claim 17, further comprising:

applying a policy associated with the access to the network based on the biometric credential information.

* * * * *